(12) United States Patent
Groninga et al.

(10) Patent No.: US 11,780,576 B1
(45) Date of Patent: Oct. 10, 2023

(54) LONG-ENDURANCE AIRCRAFT HAVING TILTABLE PROPULSION

(71) Applicant: Textron Innovations Inc., Providence, RI (US)

(72) Inventors: Kirk Landon Groninga, Keller, TX (US); Danielle Lynn Moore, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/901,200

(22) Filed: Sep. 1, 2022

(51) Int. Cl.
| | |
|---|---|
| *B64C 29/00* | (2006.01) |
| *B64C 3/00* | (2006.01) |
| *G05D 1/10* | (2006.01) |
| *B64U 30/20* | (2023.01) |
| *B64C 39/02* | (2023.01) |

(52) U.S. Cl.
CPC ............ *B64C 29/0033* (2013.01); *B64C 3/00* (2013.01); *B64C 39/024* (2013.01); *G05D 1/102* (2013.01); *B64U 30/20* (2023.01)

(58) Field of Classification Search
CPC ............................ B64C 29/0033; B64U 30/20
See application file for complete search history.

(56) References Cited

U.S. PATENT DOCUMENTS

| | | |
|---|---|---|
| 8,616,492 B2 | 12/2013 | Oliver |
| 8,820,672 B2 | 9/2014 | Erben et al. |
| 8,909,391 B1 | 12/2014 | Peeters et al. |
| 8,948,935 B1 | 2/2015 | Peeters et al. |
| 9,087,451 B1 | 7/2015 | Jarrell |
| 9,127,908 B2 | 9/2015 | Miralles |
| 9,162,753 B1 | 10/2015 | Panto et al. |
| 9,193,460 B2 | 11/2015 | Laudrain |
| 9,221,538 B2 | 12/2015 | Takahashi et al. |
| 9,284,049 B1 | 3/2016 | Wang et al. |
| 9,321,530 B2 | 4/2016 | Wang et al. |
| 9,403,593 B2 | 8/2016 | Downey et al. |
| 9,463,875 B2 | 10/2016 | Abuelsaad et al. |
| 10,513,334 B2 | 12/2019 | Groninga et al. |
| 11,077,940 B2 * | 8/2021 | Nilsen ..................... B64D 27/18 |
| 11,383,832 B2 * | 7/2022 | Spencer ............... B64D 17/025 |
| 2011/0042509 A1 | 2/2011 | Bevirt et al. |

(Continued)

*Primary Examiner* — Tien Q Dinh
*Assistant Examiner* — William L Gmoser
(74) *Attorney, Agent, or Firm* — Lawrence Youst PLLC

(57) ABSTRACT

An aircraft includes a fuselage and a wing system having first and second oppositely disposed wings that extend laterally from the fuselage. A tiltable propulsion system is rotatably coupled to the fuselage between the first and second wings. The tiltable propulsion system includes a frame system having four diagonally extending arms each having a propulsion assembly coupled thereto. A flight control system is configured to independently control each of the propulsion assemblies and the orientation of the tiltable propulsion system. In a VTOL flight mode of the aircraft, the tiltable propulsion system is substantially perpendicular to the aircraft's yaw axis in a vertical thrust orientation such that the propulsion assemblies are configured to provide vertical thrust. In a forward cruise flight mode of the aircraft, the tiltable propulsion system is substantially perpendicular to the aircraft's roll axis in a forward thrust orientation such that the propulsion assemblies provide forward thrust.

20 Claims, 13 Drawing Sheets

(56) References Cited

U.S. PATENT DOCUMENTS

| | | |
|---|---|---|
| 2015/0014475 A1 | 1/2015 | Taylor et al. |
| 2018/0002009 A1 | 1/2018 | McCullough et al. |
| 2018/0002011 A1 | 1/2018 | McCullough et al. |
| 2018/0002015 A1 | 1/2018 | McCullough et al. |
| 2018/0002016 A1 | 1/2018 | McCullough et al. |
| 2018/0044011 A1 | 2/2018 | Reichert |
| 2018/0281941 A1* | 10/2018 | Hutson ................ B64C 39/024 |
| 2022/0097840 A1* | 3/2022 | Acikel ................... B64C 3/385 |

* cited by examiner

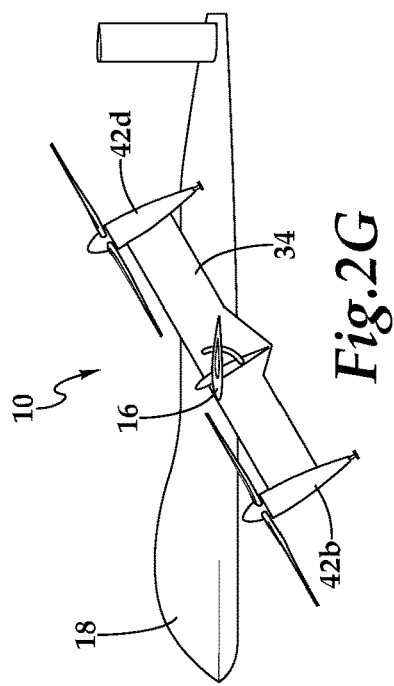
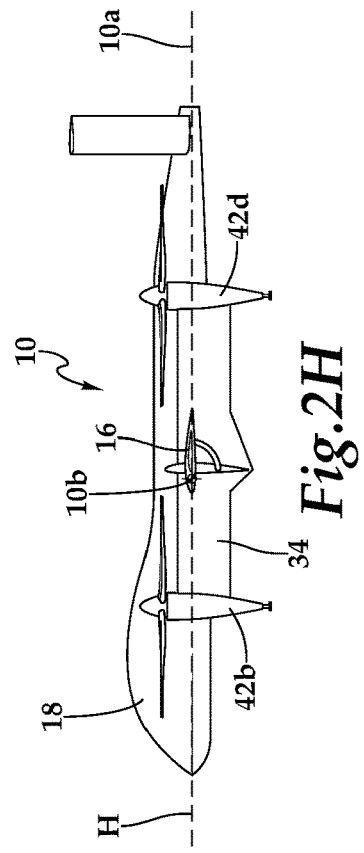
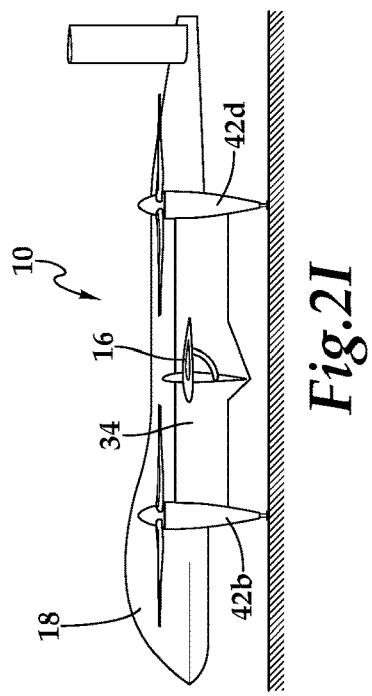

LONG-ENDURANCE AIRCRAFT HAVING TILTABLE PROPULSION

TECHNICAL FIELD OF THE DISCLOSURE

The present disclosure relates, in general, to long-endurance aircraft capable of vertical takeoff and landing and, in particular, to long-endurance unmanned aerial vehicles having a tiltable propulsion system that has a vertical thrust orientation for vertical takeoff and landing operations and a forward thrust orientation for forward cruise and loiter operations.

BACKGROUND

Long-endurance unmanned aerial vehicles (UAVs) are remotely controlled or autonomous aircraft that have primarily been used in intelligence, surveillance and reconnaissance roles. For example, such UAVs may carry payloads capable of full-motion video, daytime and nighttime imaging, voice communications relay, ad-hoc networking, tactical signals intelligence, communications intelligence, 3D mapping and ground targeting, to name a few. In addition, some long-endurance UAVs may carry lethal payloads such as laser-guided bombs, air-to-ground missiles or air-to-air missiles. Certain long-endurance UAVs fly in an altitude window of 10,000 to 30,000 feet for extended durations of time such as 12 to 48 hours.

Conventional long-endurance UAVs require either extended landing strips for launch and recover or a catapult system for launch and an arresting gear system for recovery. Attempts have been made to retrofit existing long-endurance UAVs with a vertical takeoff and landing system. For example, booms that support lift rotors have been attached to the wings of a long-endurance UAV to enable vertical takeoff and landing (VTOL), thereby eliminating the need for runways, catapults and arresting gear. In such retrofitted UAVs, forward propulsion is powered by an internal combustion engine that drives a propeller during cruise operations while lift propulsion is powered by batteries disposed in the booms that drive the lift rotors during VTOL operations. It has been found, however, that the added weight of the batteries, the booms and the lift rotors reduces the operational payload capacity of the aircraft. In addition, it has been found, that the added drag of the booms and lift rotors during forward flight reduces the range of the aircraft.

SUMMARY

In a first aspect, the present disclosure is directed to an aircraft operable to transition between a VTOL flight mode and a forward cruise flight mode. The aircraft has pitch, roll and yaw axes. The aircraft includes a fuselage and a wing system having first and second oppositely disposed wings coupled to and extending laterally from the fuselage. A tiltable propulsion system is rotatably coupled to the fuselage between the first and second wings. The tiltable propulsion system includes a frame system having four diagonally extending arms each having a propulsion assembly coupled thereto forming a distributed thrust array. A flight control system is configured to independently control each of the propulsion assemblies and to control the orientation of the tiltable propulsion system. In the VTOL flight mode, the tiltable propulsion system is substantially perpendicular to the yaw axis of the aircraft in a vertical thrust orientation such that the propulsion assemblies are configured to provide vertical thrust. In the forward cruise flight mode, the tiltable propulsion system is substantially perpendicular to the roll axis of the aircraft in a forward thrust orientation such that the propulsion assemblies provide forward thrust.

In some embodiments, the aircraft may include a wing support assembly having first and second ends with the wing support assembly partially disposed within the fuselage and with each of the first and second ends extending laterally outside of the fuselage. In such embodiments, the first wing may be coupled to the first end of the wing support assembly and the second wing may be coupled to the second end of the wing support assembly. The wing support assembly may include a forward tubular member and an aft tubular member such that a forward spar of the first wing may be coupled to the forward tubular member, an aft spar of the first wing may be coupled to the aft tubular member, a forward spar of the second wing may be coupled to the forward tubular member and an aft spar of the second wing may be coupled to the aft tubular member. In certain embodiments, the tiltable propulsion system may be rotated between the vertical thrust orientation and the forward thrust orientation about the forward tubular member of the wing support assembly. In some embodiments, a tilting system may be configured to rotate the tiltable propulsion system between the vertical thrust orientation and the forward thrust orientation wherein, the tilting system may include one or more linear actuators.

In certain embodiments, the frame system of the tiltable propulsion system may include two frame members formed from a base and two of the arms. Each base may have an arcuate slot that receives the aft tubular member of the wing support assembly such that the aft tubular member of the wing support assembly travels in the arcuate slots when the tiltable propulsion system rotates between the vertical thrust orientation and the forward thrust orientation. In some embodiments, a locking system may be configured to lock the tiltable propulsion system in the vertical thrust orientation and the forward thrust orientation. For example, the locking system may include a plurality of locks each coupled to one of the bases proximate an end of one of the arcuate slots with each of the locks configured to receive and selectively retain the aft tubular member when the tiltable propulsion system is in the vertical thrust orientation or the forward thrust orientation.

In certain embodiments, each of the propulsion assemblies may include a nacelle coupled to one of the arms, an electric motor disposed within the nacelle and a rotor assembly coupled to the electric motor and operable to rotate responsive to operation thereof. In some embodiments, the aircraft may include an electrical energy generation system, such as an internal combustion engine and an electric generator, disposed within the fuselage that is operable to provide electrical energy to each of the propulsion assemblies. In certain embodiments, each of the propulsion assemblies may include at least one battery that is disposed within the nacelle and is charged by the electrical energy generation system. In other embodiments, each of the propulsion assemblies may include a nacelle coupled to one of the arms, a hydraulic motor disposed within the nacelle and a rotor assembly coupled to the hydraulic motor and operable to rotate responsive to operation thereof.

In certain embodiments, the flight control system may command operation of the propulsion assemblies and the tiltable propulsion system responsive to at least one of remote flight control, autonomous flight control and combinations thereof. In some embodiments, in the VTOL flight mode, a first pair of the propulsion assemblies may be forward of the wings and a second pair of the propulsion assemblies may be aft of the wings and, in the forward cruise flight mode, the first pair of the propulsion assemblies may be below the wings and the second pair of the propulsion assemblies may be above the wings. In some embodiments, the wing system may include a plurality of interchangeable wing modules each having a respective aspect ratio.

In a second aspect, the present disclosure is directed to an aircraft operable to transition between a VTOL flight mode and a forward cruise flight mode. The aircraft has pitch, roll and yaw axes. The aircraft includes a fuselage and a wing system having first and second oppositely disposed wings coupled to and extending laterally from the fuselage. A tiltable propulsion system is rotatably coupled to the fuselage between the first and second wings. The tiltable propulsion system includes a frame system having four diagonally extending arms each having a propulsion assembly coupled thereto forming a distributed thrust array. A flight control system is configured to independently control each of the propulsion assemblies and to control the orientation of the tiltable propulsion system. In the VTOL flight mode, the tiltable propulsion system is substantially parallel to a plane formed by the pitch and roll axes such that the propulsion assemblies are configured to provide vertical thrust. In the forward cruise flight mode, the tiltable propulsion system is substantially parallel to a plane formed by the pitch and yaw axes such that the propulsion assemblies provide forward thrust.

In a third aspect, the present disclosure is directed to an aircraft operable to transition between a VTOL flight mode and a forward cruise flight mode. The aircraft includes a fuselage and a wing system having first and second oppositely disposed wings coupled to and extending laterally from the fuselage. A tiltable propulsion system is rotatably coupled to the fuselage between the first and second wings. The tiltable propulsion system includes a frame system having four diagonally extending arms each having a propulsion assembly coupled thereto forming a distributed thrust array, each of the propulsion assemblies including a rotor assembly. A flight control system is configured to independently control each of the propulsion assemblies and to control the orientation of the tiltable propulsion system. In the VTOL flight mode, the tiltable propulsion system is in a vertical thrust orientation in which each of the rotor assemblies rotates in substantially the same horizontal plane. In the forward cruise flight mode, the tiltable propulsion system is in a forward thrust orientation in which each of the rotor assemblies rotates in substantially the same vertical plane.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2I are schematic illustrations of an aircraft having a tiltable propulsion system in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1B:
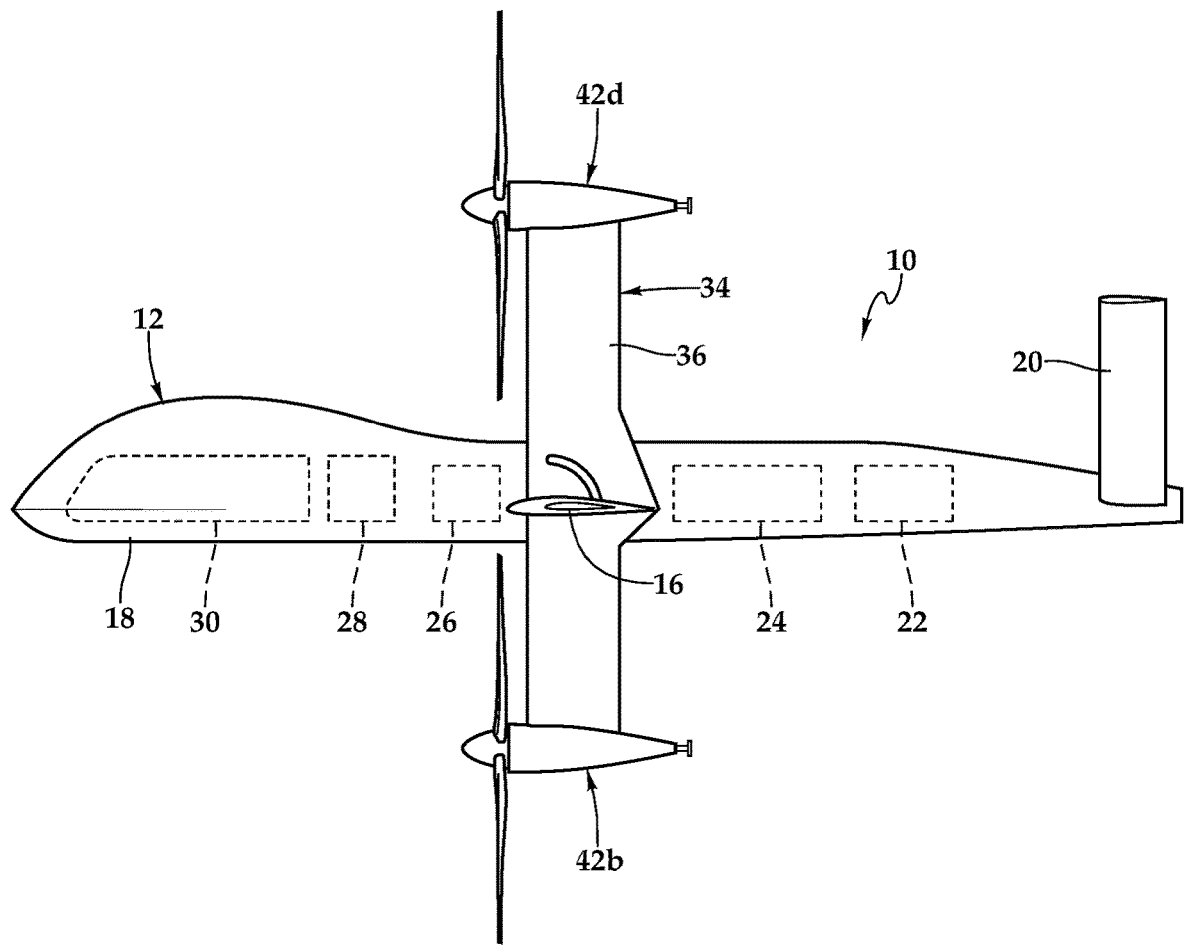
FIGS. 1A-1G are schematic illustrations of an aircraft having a tiltable propulsion system in accordance with embodiments of the present disclosure.
Figure 1A:
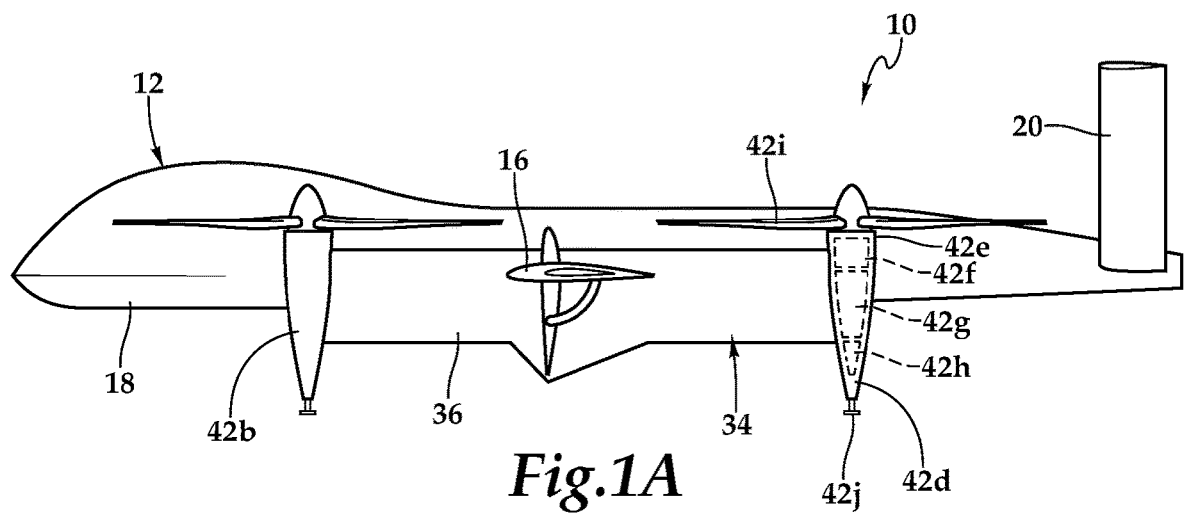
Figure 1D:
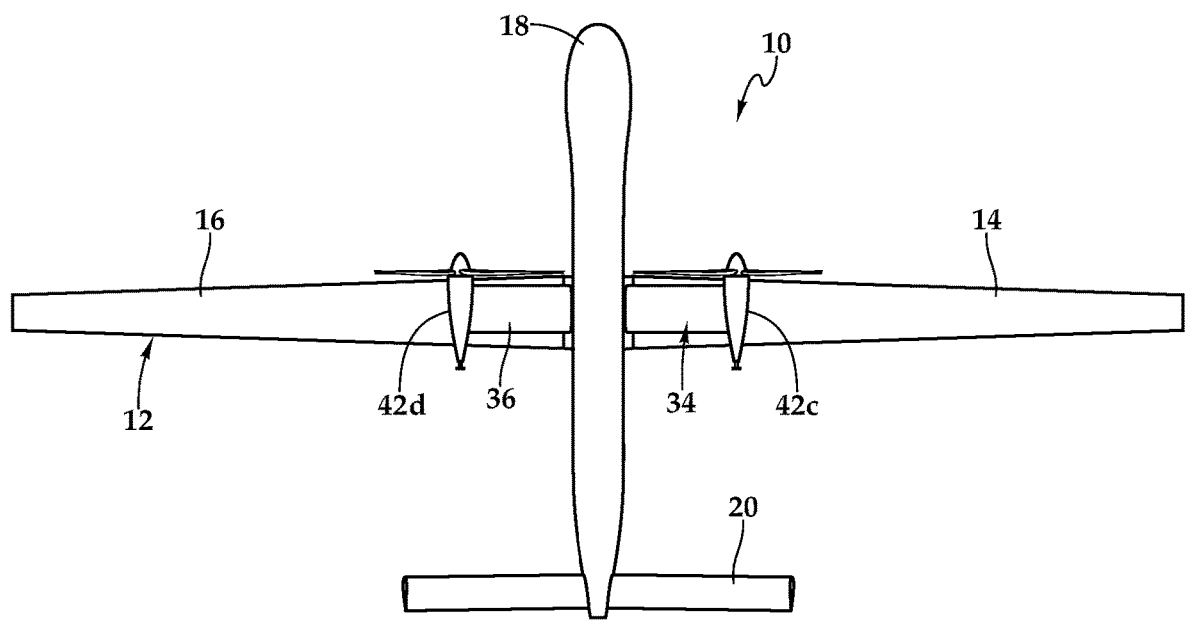
Figure 1C:
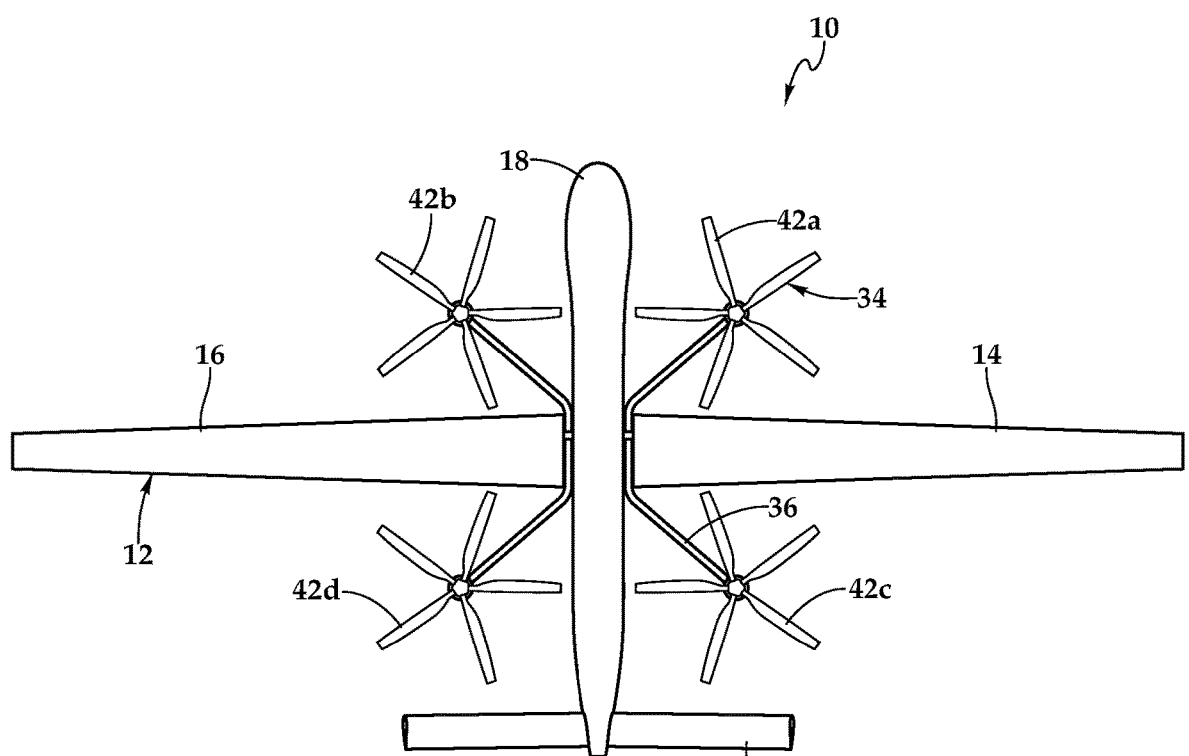
Figure 1F:
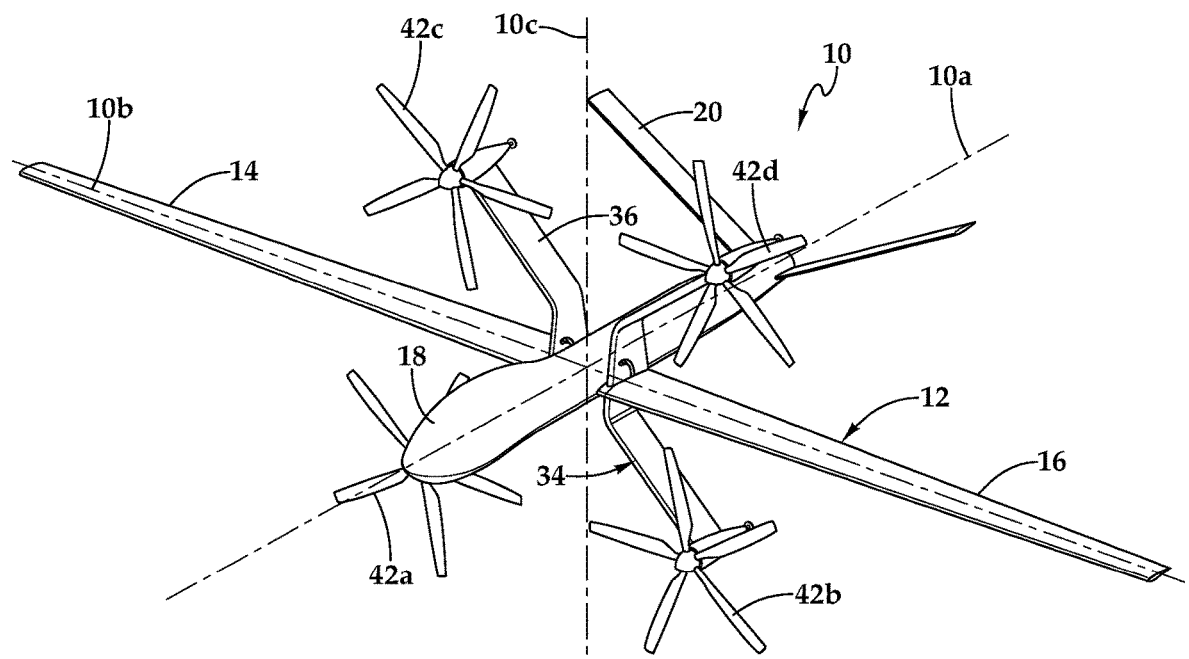
Figure 1E:
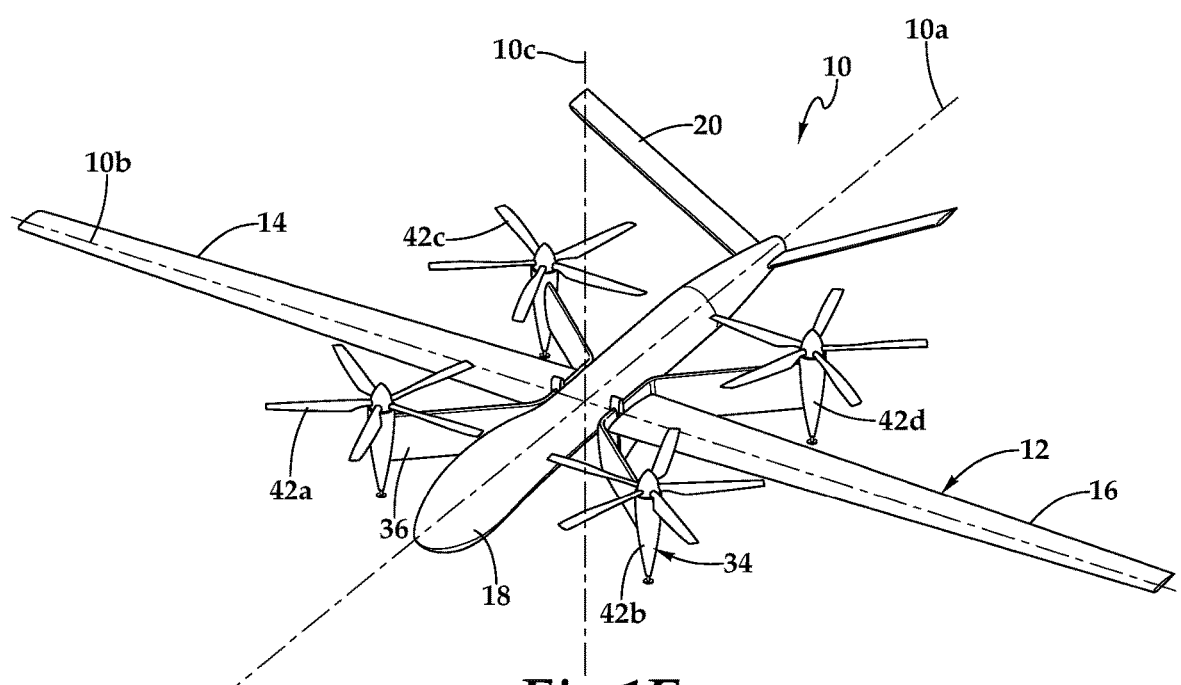

Referring to FIGS. 1A-1G in the drawings, various views of an aircraft 10 having a tiltable propulsion system that is operable to transition between a VTOL flight mode and a forward cruise flight mode are depicted. FIGS. 1A, 1C and 1E depict aircraft 10 in the VTOL flight mode wherein the propulsion assemblies provide vertical thrust. FIGS. 1B, 1D and 1F depict aircraft 10 in the forward cruise flight mode wherein the propulsion assemblies provide forward thrust with the forward airspeed of aircraft 10 providing wing-borne lift enabling aircraft 10 to engage in long-endurance flight operations. In each orientation, aircraft 10 has a longitudinal axis 10a that may also be referred to as the roll axis, a lateral axis 10b that may also be referred to as the pitch axis and a vertical axis 10c that may also be referred to as the yaw axis, as best seen in FIGS. 1E and 1F. When longitudinal axis 10a and lateral axis 10b are both in a horizontal plane and normal to the local vertical in the earth's reference frame, aircraft 10 has a level flight attitude.

In this orientation, the plane that includes longitudinal axis 10a and lateral axis 10b is a horizontal plane that is perpendicular to vertical axis 10c and which may be referred to as the pitch/roll plane. In addition, the plane that includes lateral axis 10b and vertical axis 10c is a vertical plane that is perpendicular to longitudinal axis 10a and which may be referred to as the pitch/yaw plane.

Figure 1G:
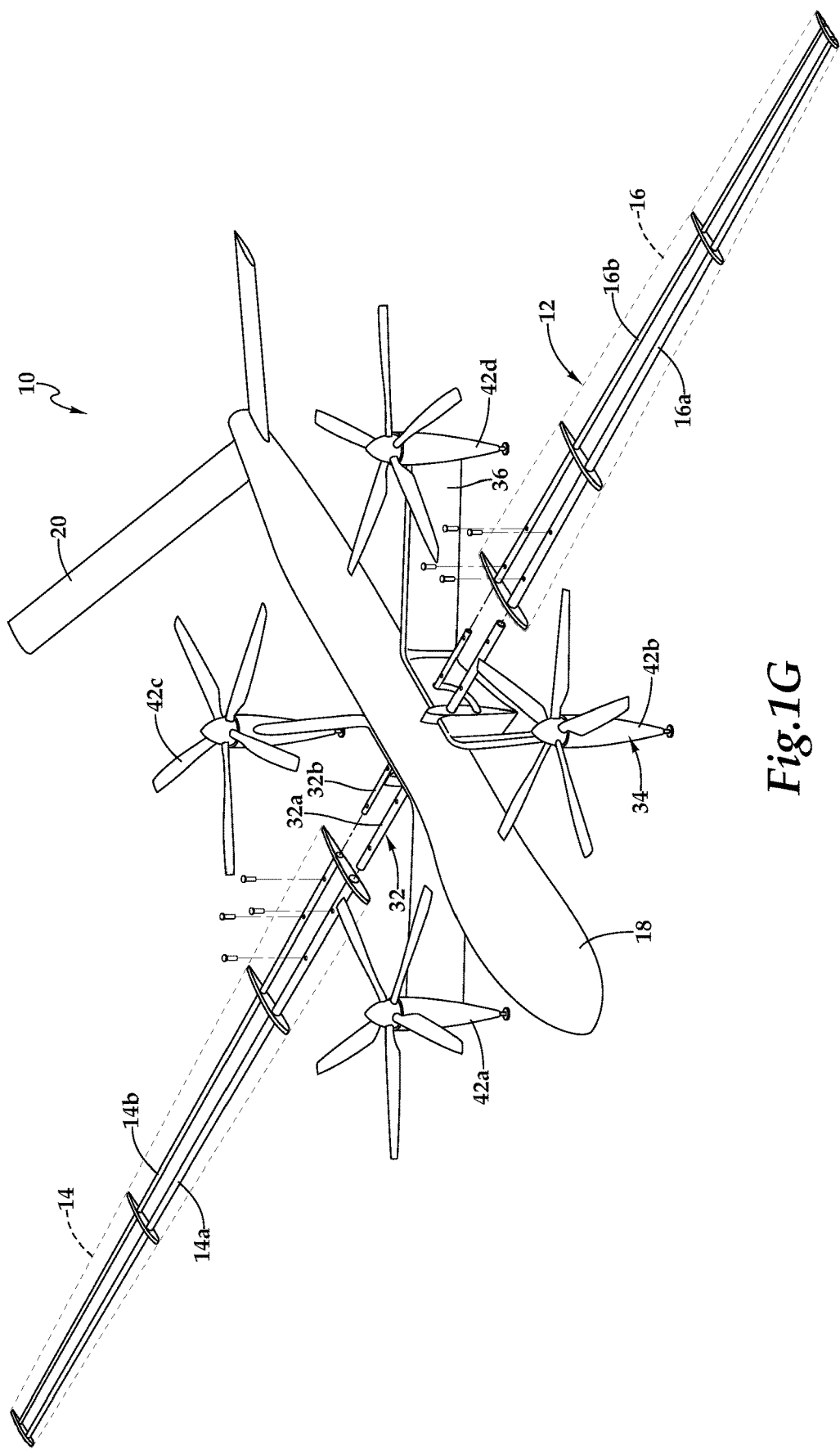

In the illustrated embodiment, aircraft 10 has an airframe 12 including wings 14, 16, a fuselage 18 and a tail assembly 20. Wings 14, 16 each have an airfoil cross-section that generates lift responsive to the forward airspeed of aircraft 10 in the forward cruise flight mode. Wings 14, 16 have a high aspect ratio, the ratio of the wingspan to the mean wing chord, which results in a high lift-to-drag ratio and thus a high aerodynamic efficiency enabling aircraft 10 to fly long-endurance missions. As best seen in FIG. 1G, wing 14 includes a forward spar 14a, an aft spar 14b, a plurality of ribs distributed along the length of wing 14 and an outer skin shown in phantom lines. Wing 16 includes a forward spar 16a, an aft spar 16b, a plurality of ribs distributed along the length of wing 16 and an outer skin shown in phantom lines. In the illustrated embodiment, each of forward spars 14a, 16a and aft spars 14b, 16b are tubular spars. In other embodiments, the forward and aft spars of the wings could have other cross-sectional shapes. The spars, ribs and skins of wings 14, 16 are preferably formed from high strength and lightweight materials such as fiberglass, carbon, plastic, metal or other suitable material or combination of materials. Wings 14, 16 preferably include ailerons (not shown) or other suitable control surfaces forming part of the trailing edge of each wing 14, 16 to control the roll of aircraft 10 in the forward cruise flight mode.

Aircraft 10 includes a longitudinally extending fuselage 18 that is used to house a variety of aircraft systems. For example, as best seen in FIG. 1B, fuselage 18 houses an electrical energy generation system 22, such as an internal combustion engine and an electric generator, a liquid fuel storage tank 24, a battery system 26, a flight control system 28 and a sensor array 30. Sensor array 30 may include one or more sensor systems capable of full-motion video, daytime and nighttime imaging, voice communications relay, ad-hoc networking, tactical signals intelligence, communications intelligence, 3D mapping, ground targeting and/or other sensor systems. Alternatively or additionally, aircraft 10 may carry a lethal payload such as laser-guided bombs, air-to-ground missiles and/or air-to-air missiles (not shown). The frames, supports, longerons, stringers, bulkheads and/or other structural components as well as the skin of fuselage 18 is preferably formed from high strength and lightweight materials such as fiberglass, carbon, plastic, metal or other suitable material or combination of materials.

Wings 14, 16 form a wing system that is coupled to fuselage 18 such that wings 14, 16 extend laterally from fuselage 18 in opposite directions. As best seen in FIG. 1G, a wing support assembly 32 is partially disposed within fuselage 18 and has first and second ends extending laterally outside of fuselage 18. More specifically, wing support assembly 32 includes a forward tubular member 32a and an aft tubular member 32b. The laterally extending ends of forward tubular member 32a are respectively received within forward spars 14a, 16a and are coupled thereto with fasteners depicted as pins that extend through openings in forward tubular member 32a and forward spars 14a, 16a when wings 14, 16 are coupled to fuselage 18. Likewise, the laterally extending ends of aft tubular member 32b are respectively received within aft spars 14b, 16b and coupled thereto with fasteners depicted as pins that extend through openings in aft tubular member 32b and aft spars 14b, 16b when wings 14, 16 are coupled to fuselage 18. Using tubular construction in the wing system and in wing support assembly 32 as well as pin connections for coupling wings 14, 16 to wing support assembly 32 enables efficient assembly and disassembly of aircraft 10 as well as efficient storage and ground transportation of aircraft 10 with a reduced footprint.

Aircraft 10 includes a tail assembly 20 depicted as a v-tail that is coupled to an aft end of fuselage 18. The ribs and skin of tail assembly 20 are preferably formed from high strength and lightweight materials such as fiberglass, carbon, plastic, metal or other suitable material or combination of materials. Tail assembly 20 preferably includes ruddervators (not shown) or other suitable control surfaces forming part of the trailing edge of each tail member to control the pitch and yaw aircraft 10 in the forward cruise flight mode.

Aircraft 10 includes a tiltable propulsion system 34 that is rotatably coupled to fuselage 18 between wings 14, 16. Tiltable propulsion system 34 includes a frame system 36 including two frame members 36a, 36b (see FIGS. 5A-5C). In the illustrated embodiment, frame members 36a, 36b are rotatable independent of one another. In other embodiments, the frame members of a frame system of a tiltable propulsion system may rotate together. Frame member 36a has a base 38a with two diagonally extending arms 40a, 40c. Frame members 36b has a base 38b with two diagonally extending arms 40b, 40d. Tiltable propulsion system 34 includes a distributed thrust array formed of a plurality of propulsion assemblies 42a, 42b, 42c, 42d, that may be collective referred to as propulsion assemblies 42. In the illustrated embodiment, propulsion assembly 42a is coupled to a distal end of diagonally extending arm 40a, propulsion assembly 42b is coupled to a distal end of diagonally extending arm 40b, propulsion assembly 42c is coupled to a distal end of diagonally extending arm 40c and propulsion assembly 42d is coupled to a distal end of diagonally extending arm 40d. By positioning propulsion assemblies 42a, 42b, 42c, 24d at the distal ends of diagonally extending arm 40a, 40b, 40c, 40d, the thrust and torque generating elements are positioned suitably outboard of the center of gravity of aircraft 10. In addition, the outboard locations of propulsion assemblies 42 prevent interference with wings 14, 16 and fuselage 18, provide dynamic stability to aircraft 10 in hover and enable a high dynamic response in the VTOL flight mode of aircraft 10 facilitating efficient and effective pitch, yaw and roll control by changing the thrust and/or torque output of certain propulsion assemblies 42 relative to other propulsion assemblies 42. In the illustrated embodiment, propulsion assemblies 42 are variable speed propulsion assemblies that have fixed pitch rotor blades. In other embodiments, propulsion assemblies 42 could have variable pitch rotor blades with collective control and/or could have thrust vectoring capabilities such as cyclic control. In the illustrated embodiment, the rotor blades of certain propulsion assemblies 42 rotate counterclockwise while the rotor blades of other propulsion assemblies 42 rotate clockwise to balance the torque of aircraft 10.

Referring specifically to FIG. 1A, details of propulsion assembly 42d will now be discussed. Propulsion assembly 42d is substantially similar to the other propulsion assemblies 42 therefore, for sake of efficiency, certain features will be disclosed only with regard to propulsion assembly 42d. One having ordinary skill in the art, however, will fully appreciate an understanding of each propulsion assembly 42 based upon the disclosure herein of propulsion assembly 42d. Propulsion assembly 42d includes a nacelle 42e that houses an electric motor 42f, a battery 42g and an electronic speed controller 42h. A rotor assembly 42i is coupled to the output of electric motor 42f. In addition, propulsion assembly 42d includes a landing gear assembly 42j that has a mechanical or pneumatic spring that biases a plunger between compressed and extended positions. For example, the spring biases the plunger into the extended position during flight and the landing force compresses the plunger into the compressed position against the bias of the spring, thereby absorbing at least a portion of the landing force.

As explained in greater detail herein, tiltable propulsion system 34 is rotatable between a vertical thrust orientation (FIGS. 1A, 1C, 1E) in the VTOL flight mode of aircraft 10 and a forward thrust orientation (FIGS. 1B, 1D, 1F) in the forward cruise flight mode of aircraft 10. In the vertical thrust orientation, tiltable propulsion system 34 is substantially perpendicular to yaw axis 10c of aircraft 10 and substantially parallel to a plane formed by pitch axis 10b and roll axis 10a which may be referred to as a horizontal plane. In the forward thrust orientation, tiltable propulsion system 34 is substantially perpendicular to roll axis 10a of aircraft 10 and substantially parallel to a plane formed by pitch axis 10b and yaw axis 10c which may be referred to as a vertical plane. In the VTOL flight mode of aircraft 10, propulsion assemblies 42a, 42b are forward of wings 14, 16 and propulsion assemblies 42c, 42d are aft of wings 14, 16. In the forward cruise flight mode of aircraft 10, propulsion assemblies 42a, 42b are below wings 14, 16 and propulsion assemblies 42c, 42d are above wings 14, 16.

Figure 2A:
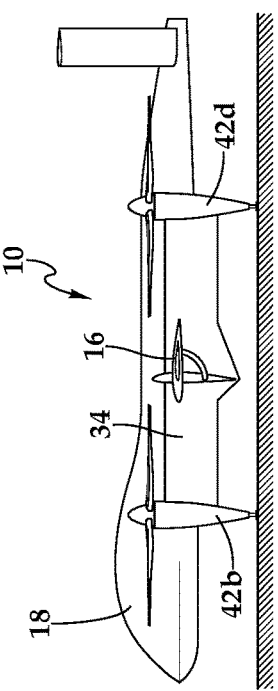

Referring additionally to FIGS. 2A-2I in the drawings, a sequential flight-operating scenario of aircraft 10 is depicted. As best seen in FIG. 2A, aircraft 10 is positioned on a surface such as the ground or the deck of an aircraft carrier. In this position, the weight of aircraft 10 has caused the plungers of the landing gear assemblies to compress the springs disposed therein such that the plungers are in retracted positions. When aircraft 10 is ready for a mission, flight control system 28 commences operations providing flight commands to the various components of aircraft 10. Flight control system 28 may be operating responsive to autonomous flight control, remote flight control or a combination thereof. For example, it may be desirable to utilize remote flight control during certain maneuvers such as takeoff and landing but rely on autonomous flight control during loiter operations.

Figure 2B:
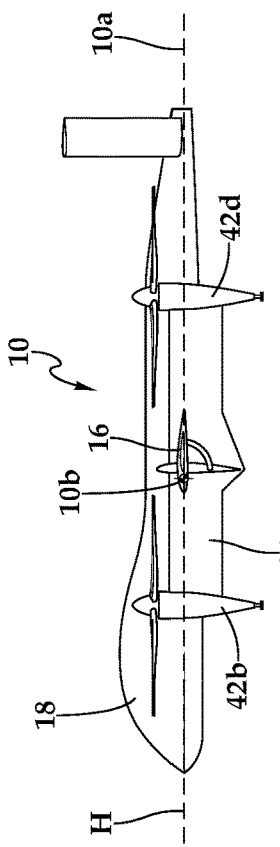

As best seen in FIG. 2B, aircraft 10 has performed a vertical takeoff and is engaged in thrust-borne lift in the VTOL flight mode of aircraft 10. As illustrated, tiltable propulsion system 34 is in the vertical thrust orientation with the rotor assemblies of propulsion assemblies 42 rotating in substantially the same horizontal plane. As longitudinal axis 10a and lateral axis 10b (denoted as the target) are both in a horizontal plane H that is normal to the local vertical in the earth's reference frame, aircraft 10 has a level flight attitude. In the VTOL flight mode, propulsion assemblies 42a, 42b are forward of wings 14, 16 and propulsion assemblies 42c, 42d are aft of wings 14, 16 forming a quadcopter configuration. As discussed herein, flight control system 28 independently controls and operates each propulsion assembly 42 including independently controlling speed. During hover, flight control system 28 may utilize differential speed control of propulsion assemblies 42 to provide hover stability for aircraft 10 and to provide pitch, roll, yaw and translation authority for aircraft 10.

Figure 2C:
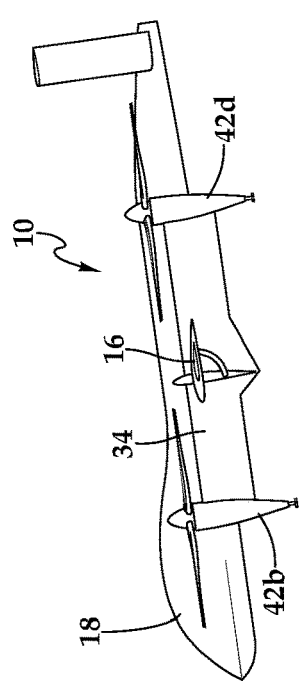
Figure 2D:
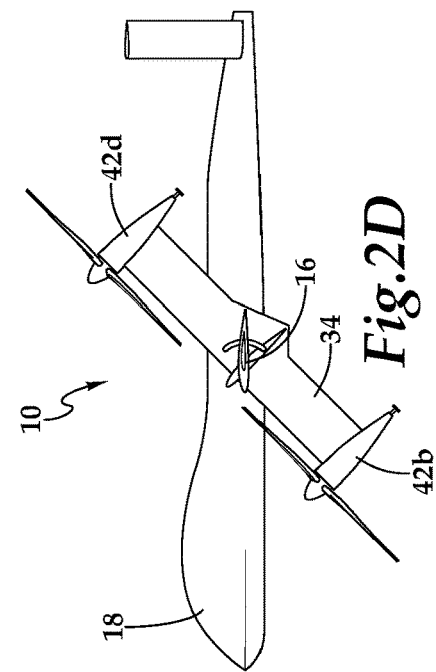
Figure 2E:
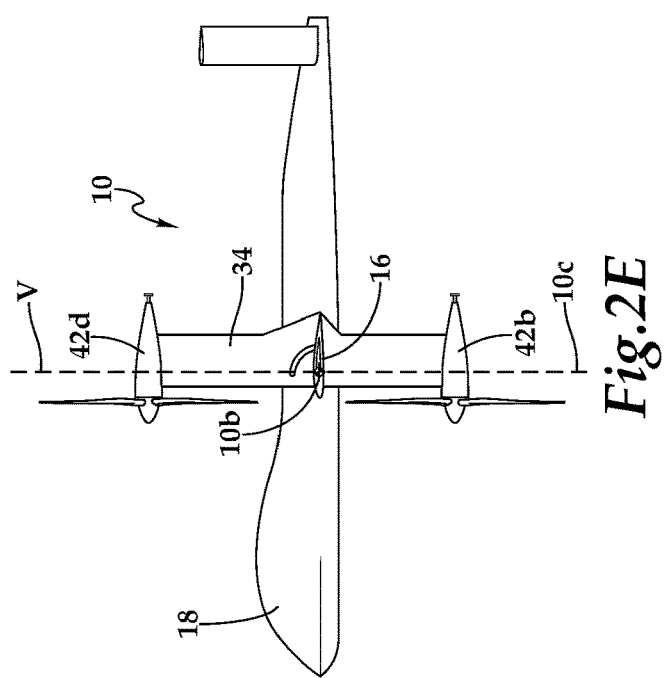

After vertical ascent to the desired elevation, aircraft 10 may transition from thrust-borne lift to wing-borne lift, as best seen from the progression of FIGS. 2B-2E. In FIG. 2C, aircraft 10 has performed a pitch down maneuver to gain forward speed by increasing the speed of the propulsion assemblies 42c, 42d relative to propulsion assemblies 42a, 42b. Once aircraft 10 has surpassed a forward speed threshold, tiltable propulsion system 34 may rotate from the vertical thrust orientation to the forward thrust orientation relative to wings 14, 16 and fuselage 18. In FIG. 2D, tiltable propulsion system 34 has rotated approximately forty-five degrees from the vertical thrust orientation toward the forward thrust orientation as aircraft 10 gains more forward speed and wings 14, 16 provide a greater lifting force. As best seen in FIG. 2E, aircraft 10 has completed the transition to the forward cruise flight mode with tiltable propulsion system 34 in the forward thrust orientation with the rotor assemblies of propulsion assemblies 42 each rotating in substantially the same vertical plane which is parallel to a vertical plane V that includes yaw axis 10c and lateral axis 10b.

In the forward cruise flight mode, propulsion assemblies 42a, 42b are below wings 14, 16 and propulsion assemblies 42c, 42d are above wings 14, 16. As forward flight with wing-borne lift requires significantly less power than VTOL flight with thrust-borne lift, the operating speed of propulsion assemblies 42 may now be reduced. In this configuration, aircraft 10 may engage in a long-endurance flight with pitch, roll and yaw authority provided by aircraft control surfaces and aircraft speed controlled by the operating speed of propulsion assemblies 42.

Figure 2F:
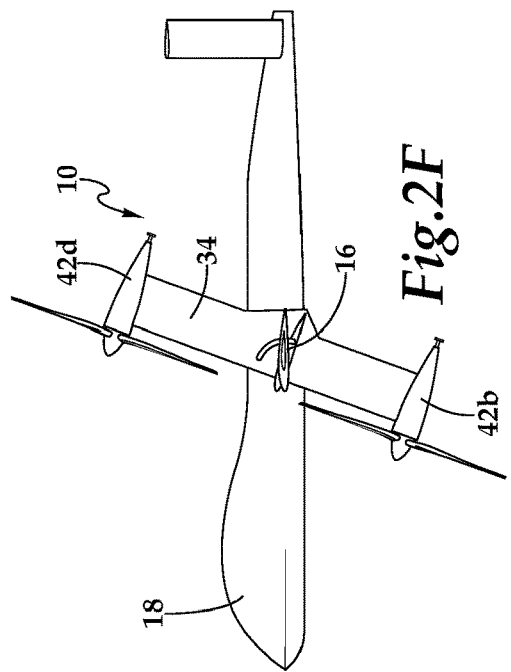

As aircraft 10 approaches the end of the mission, aircraft 10 may begin its transition from wing-borne lift to thrust-borne lift. As best seen from the progression of FIGS. 2E-2H, tiltable propulsion system 34 rotates from the forward thrust orientation to the vertical thrust orientation. In FIG. 2F, tiltable propulsion system 34 has rotated approximately thirty degrees from the forward thrust orientation toward the vertical thrust orientation with the operating speed of propulsion assemblies 42 increasing and the forward speed of aircraft 10 decreasing. In FIG. 2G, tiltable propulsion system 34 has rotated approximately sixty degrees from the forward thrust orientation toward the vertical thrust orientation such that propulsion assemblies 42 provide significant lifting force and minimal forward thrust. In FIG. 2H, aircraft 10 has completed the transition to the VTOL flight mode with the rotor assemblies of propulsion assemblies 42 rotating in substantially the same horizontal. Once aircraft 10 has completed the transition to the VTOL flight mode, aircraft 10 may commence its vertical descent to a surface. As aircraft 10 is landing, the weight of aircraft 10 causes the plungers of the landing gear assemblies to transition to the retracted positions, thereby providing damping of the landing impact. As best seen in FIG. 2I, aircraft 10 has landed at the desired location.

Figure 3:
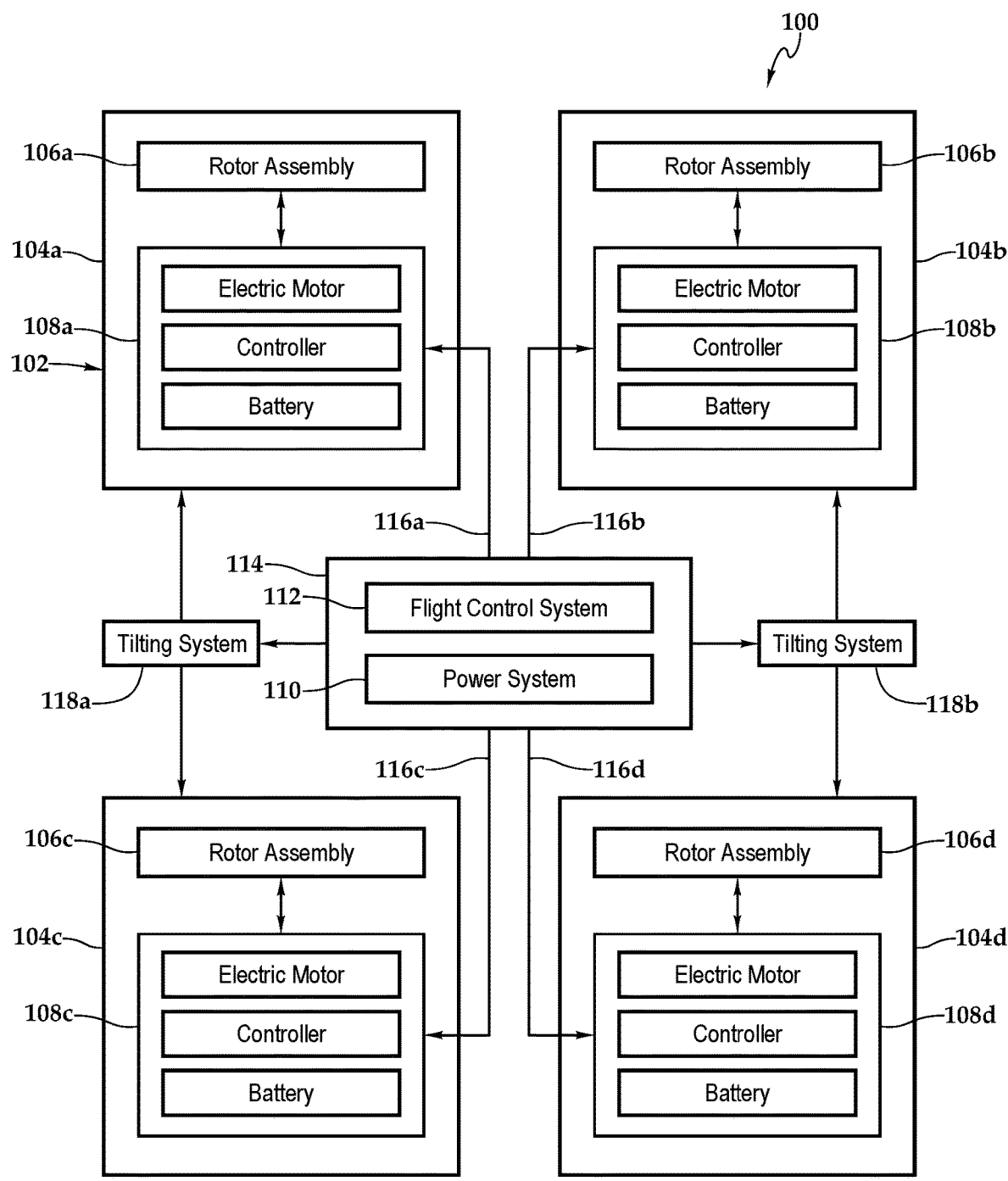
FIG. 3 is block diagram of a propulsion and control system for an aircraft having a tiltable propulsion system in accordance with embodiments of the present disclosure.

Referring next to FIG. 3, a block diagram depicts the propulsion and control systems for an aircraft 100 having a tiltable propulsion system 102 that is also representative of aircraft 10 discussed herein. Specifically, aircraft 100 includes four propulsion assemblies 104a, 104b, 104c, 104d that respectively support four rotor assemblies 106a, 106b, 106c, 106d that form a distributed thrust array. Propulsion assemblies 104a, 104b, 104c, 104d also include electronic packages 108a, 108b, 108c, 108d each of which includes an electric motor, an electronic speed controller and a battery. In the illustrated embodiment, a power system 110, such as an internal combustion engine and an electric generator, and a flight control system 112 are disposed with fuselage 114. Power system 110 and flight control system 112 are operably associated with each of propulsion assemblies 104a, 104b, 104c, 104d by a communications network depicted as arrows 116*a*, 116*b*, 116*c*, 116*d*. Flight control system 112 is also in communication with tilting systems 118*a*, 118*b* that enable tiltable propulsion system 102 to transition between the forward thrust orientation and the vertical thrust orientation. In other embodiments, rotor assemblies 106*a*, 106*b*, 106*c*, 106*d* may be hydraulically powered in which case, the electric motors would be replaced with hydraulic motors and the power system would include a hydraulic pump. In still other embodiments, aircraft 100 may be a fully electric aircraft in which case the power system would consist of an array of batteries.

Figure 4:
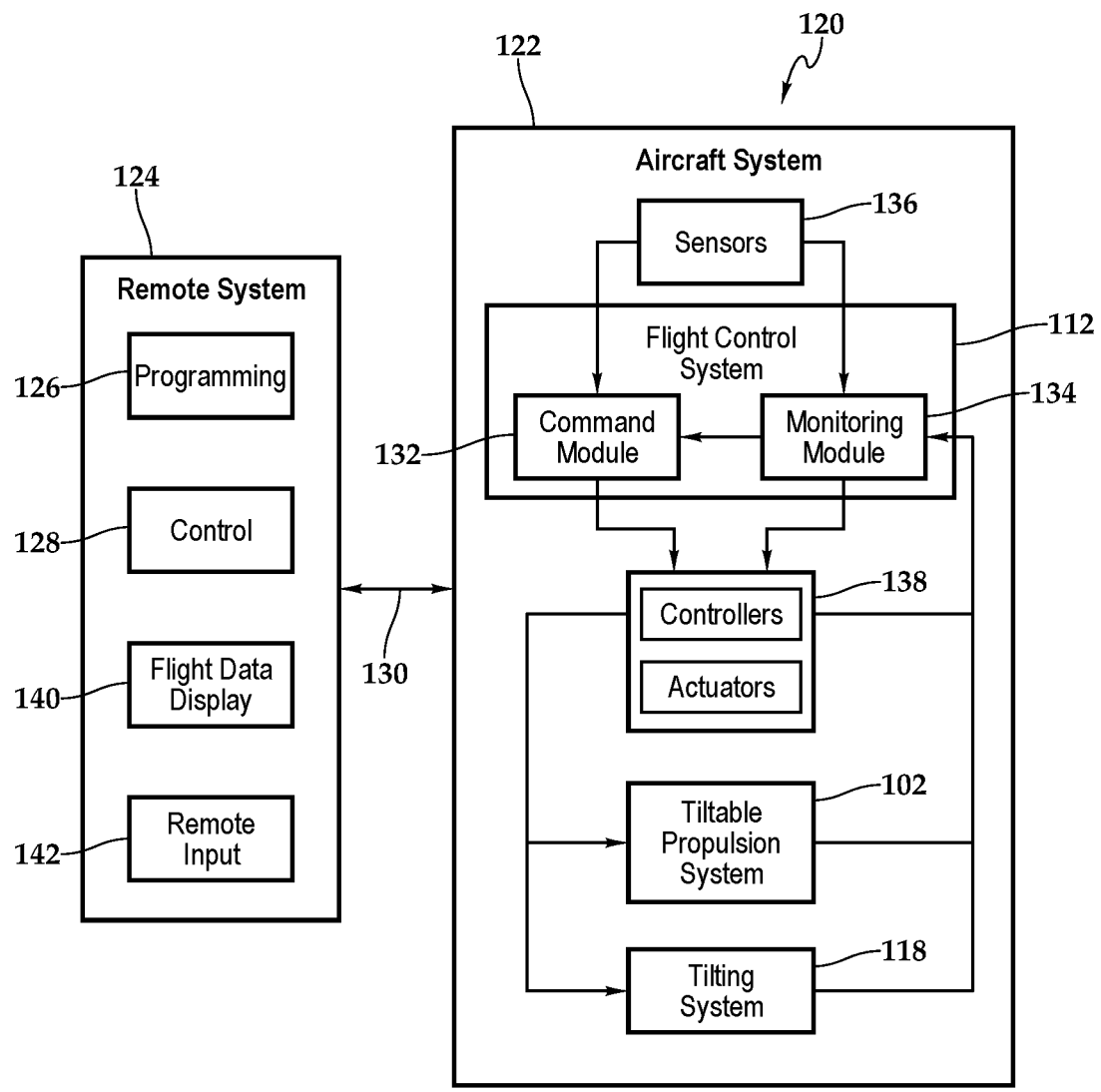
FIG. 4 is system diagram of an aircraft having a tiltable propulsion system in accordance with embodiments of the present disclosure.

Referring additionally to FIG. 4 in the drawings, systems 120 for use with aircraft 100 or aircraft 10 are depicted. In the illustrated embodiment, systems 120 include two primary computer based subsystems; namely, an aircraft system 122 and a remote system 124. In some implementations, remote system 124 includes a programming application 126 and a remote control application 128. Programming application 126 enables a user to provide a flight plan and mission information to aircraft 100 such that flight control system 112 may engage in autonomous control over aircraft 100. For example, programming application 126 may communicate with flight control system 112 over a wired or wireless communication channel 130 to provide mission protocols. Following programming, aircraft 100 may operate autonomously responsive to commands generated by flight control system 112.

Flight control system 112 preferably includes a non-transitory computer readable storage medium including a set of computer instructions executable by a processor. Flight control system 112 may be a triply redundant system implemented on one or more general-purpose computers, special purpose computers or other machines with memory and processing capability. For example, flight control system 112 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 112 may be a microprocessor-based system operable to execute program code in the form of machine-executable instructions. In addition, flight control system 112 may be selectively connectable to other computer systems via a proprietary encrypted network, a public encrypted network, the Internet or other suitable communication network that may include both wired and wireless connections.

In the illustrated embodiment, flight control system 112 includes a command module 132 and a monitoring module 134. It is to be understood by those skilled in the art that these and other modules executed by flight control system 112 may be implemented in a variety of forms including hardware, software, firmware, special purpose processors and combinations thereof. Flight control system 112 receives input from a variety of sources including internal sources such as sensors 136, controllers/actuators 138, tiltable propulsion system 102 and tilting system 118 and external sources such as remote system 124 as well as global positioning system satellites or other location positioning systems and the like. For example, as discussed herein, flight control system 112 may receive a flight plan for a mission from remote system 124. Thereafter, flight control system 112 may be operable to autonomously control all aspects of flight of an aircraft of the present disclosure.

For example, during the various operating modes of aircraft 100 including VTOL flight mode, forward cruise flight mode and transitions therebetween, command module 132 provides commands to controllers/actuators 138. These commands enable independent operation of each propulsion assembly 104*a*, 104*b*, 104*c*, 104*d* including rotor speed. Flight control system 112 receives feedback from controllers/actuators 138, tiltable propulsion system 102 and tilting system 118. This feedback is processed by monitoring module 134 that can supply correction data and other information to command module 132 and/or controllers/actuators 138. Sensors 136, such as an attitude and heading reference system (AHRS) with solid-state or microelectromechanical systems (MEMS) gyroscopes, accelerometers and magnetometers as well as other sensors including positioning sensors, speed sensors, environmental sensors, fuel sensors, temperature sensors, location sensors and the like also provide information to flight control system 112 to further enhance autonomous control capabilities.

Some or all the autonomous control capability of flight control system 112 can be augmented or supplanted by remote flight control from, for example, remote system 124. Remote system 124 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 124 communicates with flight control system 112 via a communication link 130 that may include both wired and wireless connections.

While operating remote control application 128, remote system 124 is configured to display information relating to one or more aircraft of the present disclosure on one or more flight data display devices 140. Display devices 140 may be configured in any suitable form, including, for example, liquid crystal displays, light emitting diode displays or any suitable type of display. Remote system 124 may also include audio output and input devices such as a microphone, speakers and/or an audio port allowing an operator to communicate with other operators or a base station. The display device 140 may also serve as a remote input device 142 if a touch screen display implementation is used, however, other remote input devices, such as a keyboard or joystick, may alternatively be used to allow an operator to provide control commands to an aircraft being operated responsive to remote control.

Figure 5B:
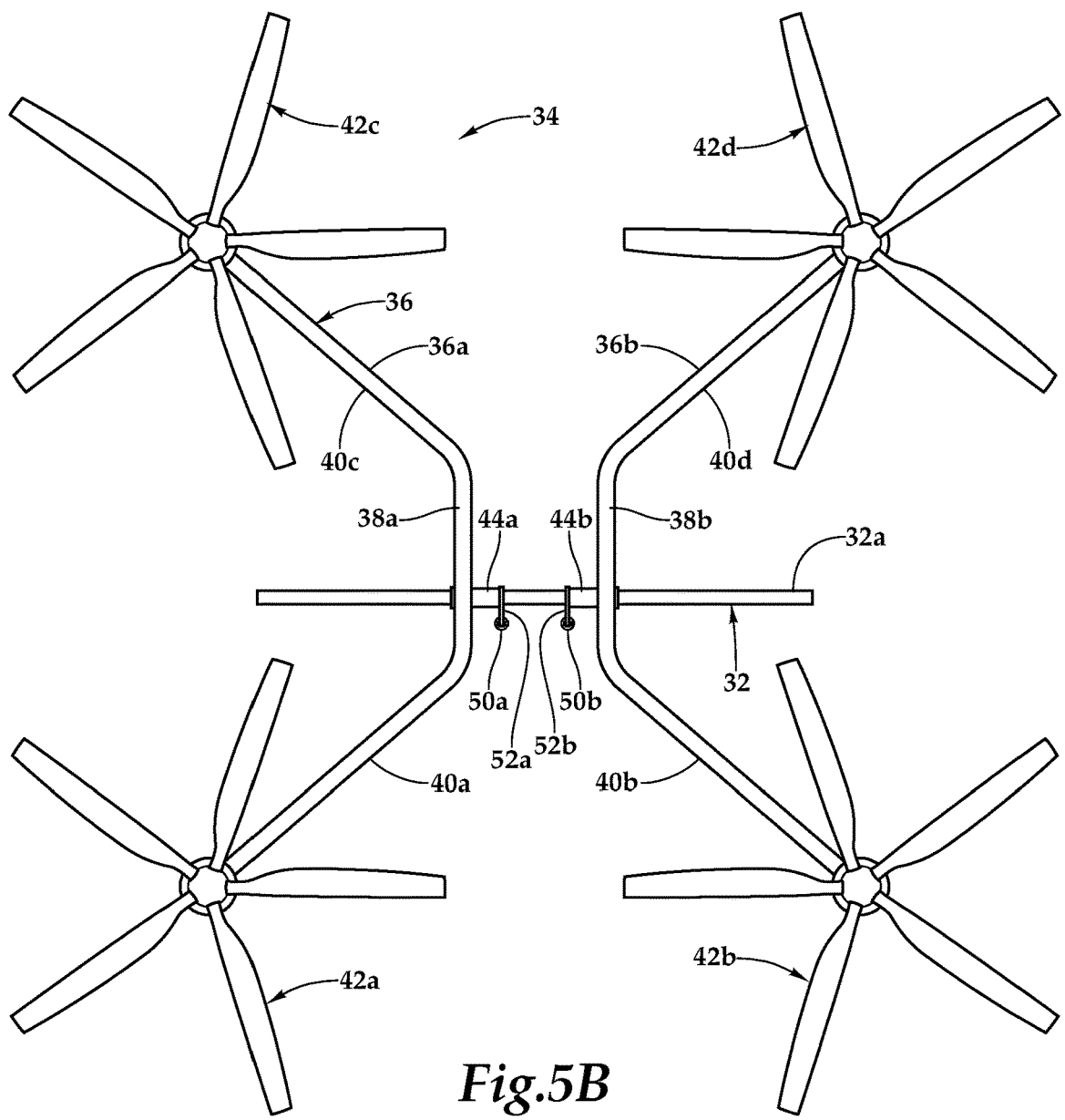
FIGS. 5A-5C are schematic illustrations of a tiltable propulsion system of an aircraft in accordance with embodiments of the present disclosure.
Figure 5A:
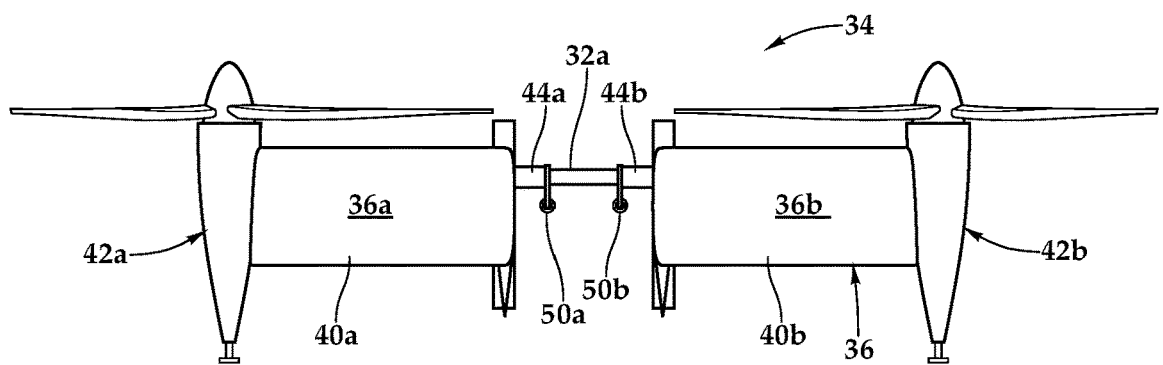
Figure 5C:
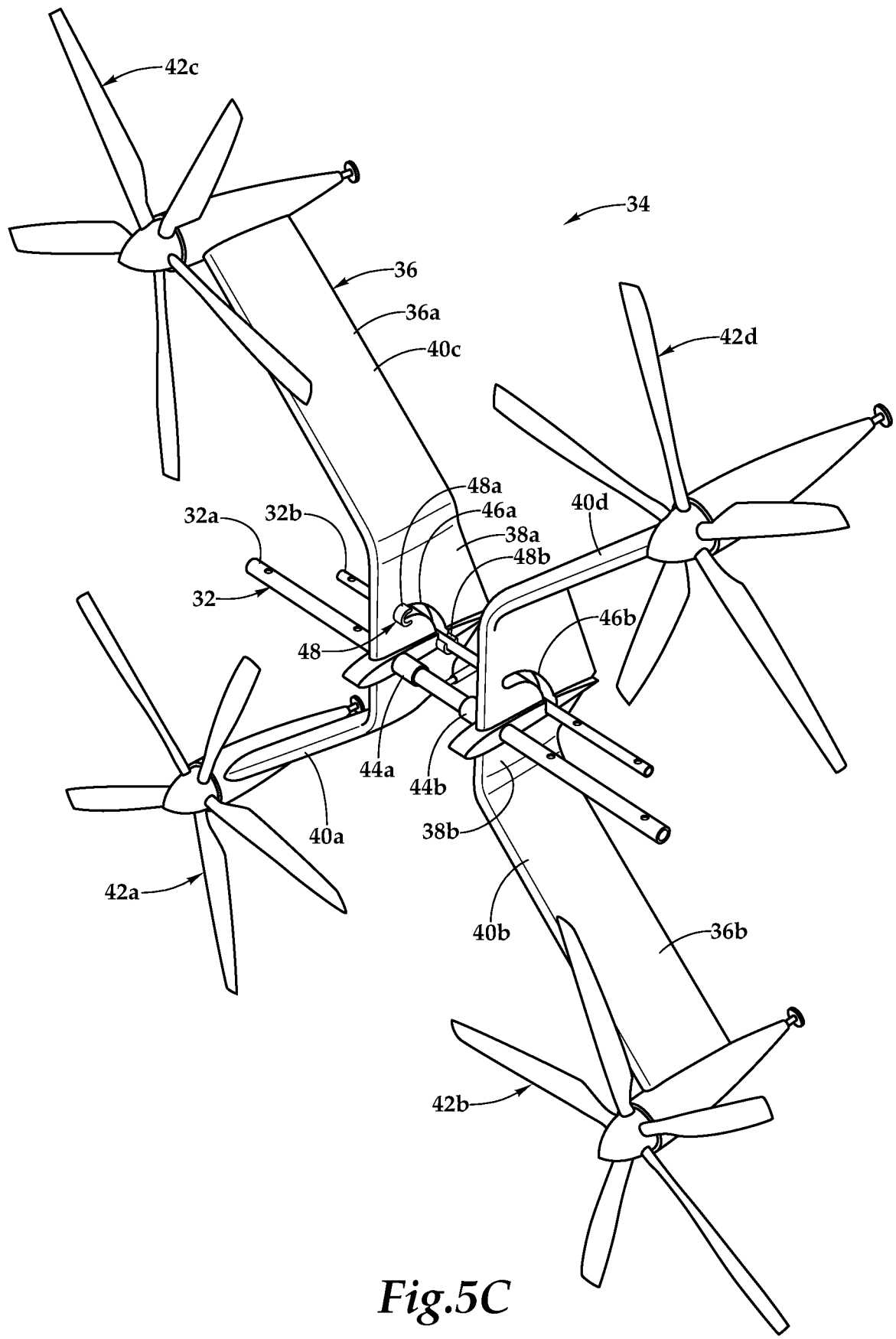

Referring to FIGS. 5A-5C of the drawings, the tilting operation of tiltable propulsion system 34 will be discussed in more detail. Tiltable propulsion system 34 includes frame system 36 including two frame members 36*a*, 36*b*. Frame member 36*a* has a base 38*a* with two diagonally extending arms 40*a*, 40*c* that respectively support propulsion assemblies 42*a*, 42*c*. Frame member 36*b* has a base 38*b* with two diagonally extending arms 40*b*, 40*d* that respectively support propulsion assemblies 42*b*, 42*d*. Frame member 36*a* is rotatably coupled to forward tubular member 32*a* of wing support system 32 by a bearing 44*a*. Frame member 36*b* is rotatably coupled to forward tubular member 32*a* of wing support assembly 32 by a bearing 44b. Base 38a has an arcuate slot 46a (see FIGS. 6A-6B) and base 38b has an arcuate slot 46b that together receive aft tubular member 32b of wing support assembly 32 such that aft tubular member 32b travels in arcuate slots 46a, 46b when tiltable propulsion system 34 rotates between the forward thrust orientation and the vertical thrust orientation.

Figure 6B:
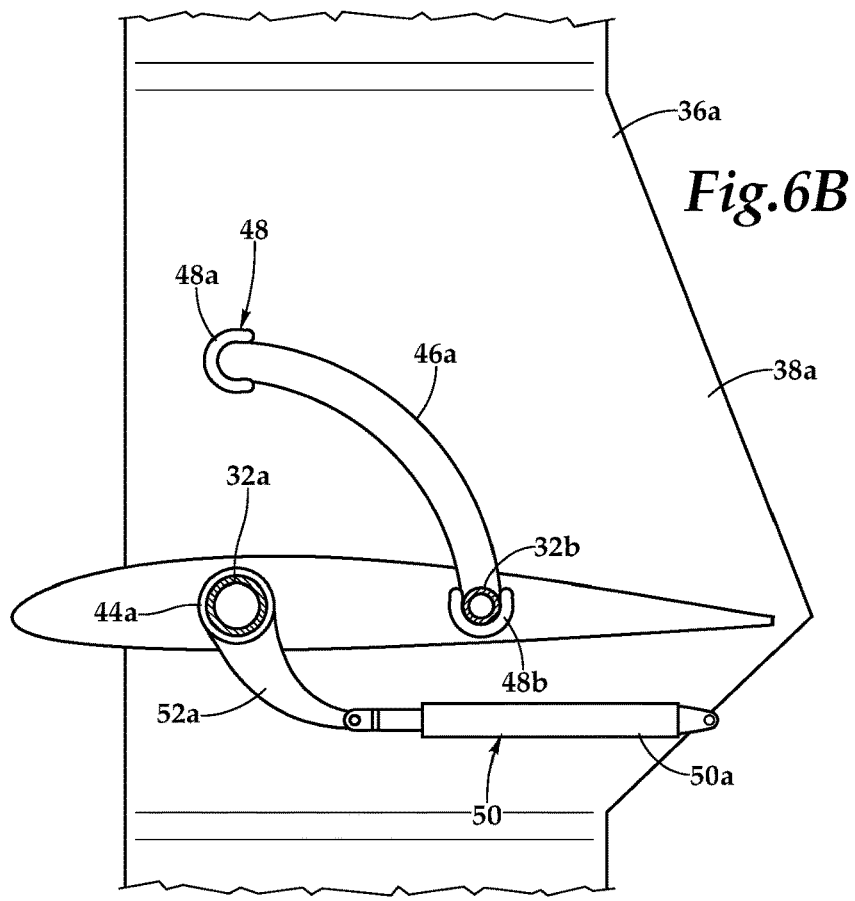
FIGS. 6A-6B are schematic illustrations of a tilting system for a tiltable propulsion system of an aircraft in accordance with embodiments of the present disclosure.
Figure 6A:
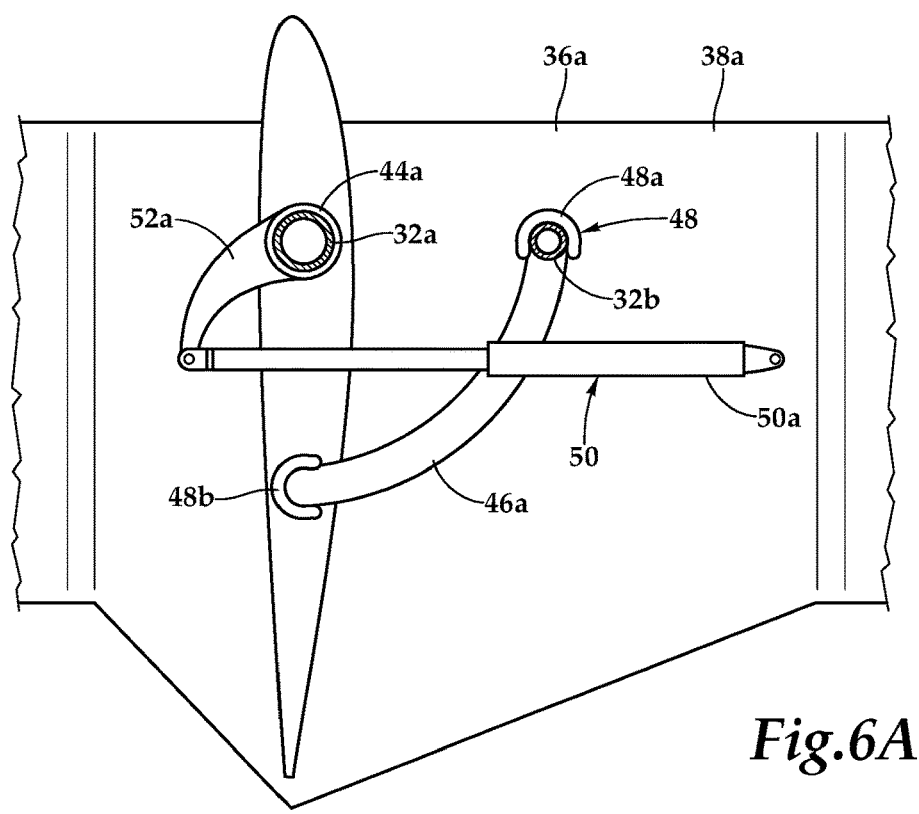

In the illustrated embodiment, a locking system 48 is configured to lock tiltable propulsion system 34 in the forward thrust and vertical thrust orientations. As best seen in FIGS. 6A-6B, locking system 48 include locks 48a, 48b that are coupled to base 38a proximate the ends of arcuate slot 46a. Similar locking members (not visible) are coupled to base 38b proximate the ends of arcuate slot 46b. The locks are configured to receive and selectively retain aft tubular member 32b therein when tiltable propulsion system 34 is in either the forward thrust orientation or the vertical thrust orientation. For example, in the forward thrust orientation of tiltable propulsion system 34, aft tubular member 32b is secured within lock 48b, as best seen in FIG. 6B. Likewise, in the vertical thrust orientation of tiltable propulsion system 34, aft tubular member 32b is secured within lock 48a, as best seen in FIG. 6A.

Tiltable propulsion system 34 is rotated about forward tubular member 32a between the forward thrust orientation and the vertical thrust orientation by a tilting system 50. In the illustrated embodiment, tilting system 50 includes two actuators depicted as linear actuators 50a, 50b. Actuator 50a is coupled to the fuselage of the aircraft on one end (not shown) and to bearing 44a on the opposite end via a crank 52a. Likewise, actuator 50b is coupled to the fuselage of the aircraft on one end (not shown) and to bearing 44b on the opposite end via a crank 52b. As best seen by comparing FIGS. 6A and 6B, in the contracted position of actuator 50a, frame member 36a is in the forward thrust orientation and in the extended position of actuator 50a, frame member 36a is in the vertical thrust orientation. Operation of actuator 50a causes bearing 44a and thus frame member 36a to rotate about forward tubular member 32a. Likewise, in the contracted position of actuator 50b, frame member 36b is in the forward thrust orientation and in the extended position of actuator 50b, frame member 36b is in the vertical thrust orientation. Operation of actuator 50b causes bearing 44b and thus frame member 36b to rotate about forward tubular member 32a. In the illustrated embodiment, actuators 50a, 50b may operate independently to separately rotate frame members 36a, 36b. In other embodiments, bearings 44a, 44b may be coupled together, in which case, frame members 36a, 36b must rotate together. In such embodiments, only a single actuator may be required. Allowing frame members 36a, 36b to rotate independently, however, has certain advantages such as differentially tilting frame members 36a, 36b relative to one another to provide yaw authority for the aircraft in the VTOL flight mode.

Figure 7:
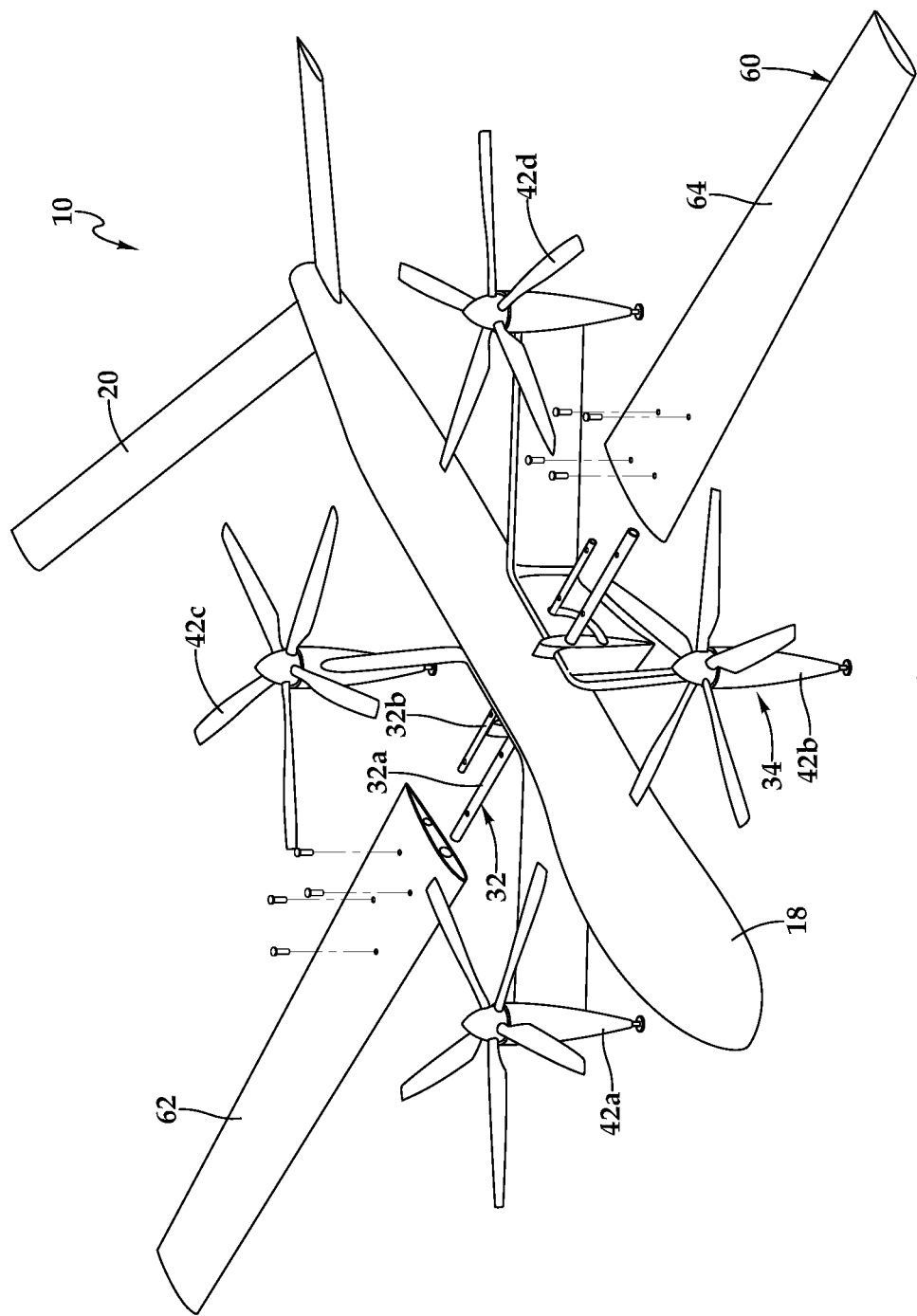
FIG. 7 is a schematic illustration of an aircraft having a tiltable propulsion system and an interchangeable wing system in accordance with embodiments of the present disclosure.

Referring now to FIG. 7 in the drawings, certain advantages of the wing system of aircraft 10 will now be discussed. As described herein with reference to FIGS. 1A-1G, the use of wings having a high aspect ratio can be beneficial when long-endurance flight operations are desired. It may be desirable, however, to fly aircraft 10 in a forward dash flight mode at higher speeds but for shorter durations. In such cases, the interchangeable wing modules of the wing system of aircraft 10 enable wings with various aspect ratios to be efficiently attached to and detached from wing support assembly 32. As illustrated, a wing module 60 is being used to replace the wing module including wings 14, 16 from 1A-1G with interchangeable wings 62, 64 that have a considerably lower aspect ratio to enable the forward dash flight mode of aircraft 10.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft operable to transition between a VTOL flight mode and a forward cruise flight mode, the aircraft having pitch, roll and yaw axes, the aircraft comprising:
    a fuselage;
    a wing system including first and second oppositely disposed wings coupled to and extending laterally from the fuselage;
    a tiltable propulsion system rotatably coupled to the fuselage between the first and second wings, the tiltable propulsion system including a frame system having four diagonally extending arms each having a propulsion assembly coupled thereto forming a distributed thrust array; and
    a flight control system configured to independently control each of the propulsion assemblies and configured to control the orientation of the tiltable propulsion system;
    wherein, in the VTOL flight mode, the tiltable propulsion system is substantially perpendicular to the yaw axis of the aircraft in a vertical thrust orientation such that the propulsion assemblies are configured to provide vertical thrust; and
    wherein, in the forward cruise flight mode, the tiltable propulsion system is substantially perpendicular to the roll axis of the aircraft in a forward thrust orientation such that the propulsion assemblies provide forward thrust.

2. The aircraft as recited in claim 1 further comprising a wing support assembly having first and second ends, the wing support assembly partially disposed within the fuselage with each of the first and second ends extending laterally outside of the fuselage; and
    wherein, the first wing is coupled to the first end of the wing support assembly and the second wing is coupled to the second end of the wing support assembly.

3. The aircraft as recited in claim 2 wherein the wing support assembly further comprises a forward tubular member and an aft tubular member;
    wherein, the first wing includes a forward spar that is coupled to the forward tubular member and an aft spar that is coupled to the aft tubular member; and
    wherein, the second wing includes a forward spar that is coupled to the forward tubular member and an aft spar that is coupled to the aft tubular member.

4. The aircraft as recited in claim 3 wherein the tiltable propulsion system is rotated between the vertical thrust orientation and the forward thrust orientation about the forward tubular member of the wing support assembly.

5. The aircraft as recited in claim 4 further comprising a tilting system configured to rotate the tiltable propulsion system between the vertical thrust orientation and the forward thrust orientation.

6. The aircraft as recited in claim 5 wherein the tilting system further comprises at least one linear actuator.

7. The aircraft as recited in claim 5 wherein the tilting system further comprises first and second linear actuators.

8. The aircraft as recited in claim 4 wherein the frame system of the tiltable propulsion system includes two frame members each formed from a base and two of the arms, each base having an arcuate slot that receives the aft tubular member of the wing support assembly such that the aft tubular member of the wing support assembly travels in the arcuate slots when the tiltable propulsion system rotates between the vertical thrust orientation and the forward thrust orientation.

9. The aircraft as recited in claim 8 further comprising a locking system configured to lock the tiltable propulsion system in the vertical thrust orientation and the forward thrust orientation.

10. The aircraft as recited in claim 9 wherein the locking system further comprises a plurality of locks each coupled to one of the bases proximate an end of one of the arcuate slots, each of the locks configured to receive and selectively retain the aft tubular member when the tiltable propulsion system is in the vertical thrust orientation or the forward thrust orientation.

11. The aircraft as recited in claim 1 wherein each of the propulsion assemblies further comprises a nacelle coupled to one of the arms;
    an electric motor disposed within the nacelle; and
    a rotor assembly coupled to the electric motor and operable to rotate responsive to operation thereof.

12. The aircraft as recited in claim 1 further comprising an electrical energy generation system disposed within the fuselage operable to provide electrical energy to each of the propulsion assemblies.

13. The aircraft as recited in claim 12 wherein the electrical energy generation system further comprises an internal combustion engine and an electric generator.

14. The aircraft as recited in claim 12 wherein each of the propulsion assemblies further comprises at least one battery and wherein the electrical energy provided by the electrical energy generation system charges the batteries.

15. The aircraft as recited in claim 1 wherein each of the propulsion assemblies further comprises a nacelle coupled to one of the arms;
    a hydraulic motor disposed within the nacelle; and
    a rotor assembly coupled to the hydraulic motor and operable to rotate responsive to operation thereof.

16. The aircraft as recited in claim 1 wherein the flight control system commands operation of the propulsion assemblies and the tiltable propulsion system responsive to at least one of remote flight control, autonomous flight control and combinations thereof.

17. The aircraft as recited in claim 1 wherein, in the VTOL flight mode, a first pair of the propulsion assemblies is forward of the wings and a second pair of the propulsion assemblies is aft of the wings; and
    wherein, in the forward cruise flight mode, the first pair of the propulsion assemblies is below the wings and the second pair of the propulsion assemblies is above the wings.

18. The aircraft as recited in claim 1 wherein the wing system includes a plurality of interchangeable wing modules each having a respective aspect ratio.

19. An aircraft operable to transition between a VTOL flight mode and a forward cruise flight mode, the aircraft having pitch, roll and yaw axes, the aircraft comprising:
    a fuselage;
    a wing system including first and second oppositely disposed wings coupled to and extending laterally from the fuselage;
    a tiltable propulsion system rotatably coupled to the fuselage between the first and second wings, the tiltable propulsion system including a frame system having four diagonally extending arms each having a propulsion assembly coupled thereto forming a distributed thrust array; and
    a flight control system configured to independently control each of the propulsion assemblies and configured to control the orientation of the tiltable propulsion system;
    wherein, in the VTOL flight mode, the tiltable propulsion system is substantially parallel to a plane formed by the pitch and roll axes such that the propulsion assemblies are configured to provide vertical thrust; and
    wherein, in the forward cruise flight mode, the tiltable propulsion system is substantially parallel to a plane formed by the pitch and yaw axes such that the propulsion assemblies provide forward thrust.

20. An aircraft operable to transition between a VTOL flight mode and a forward cruise flight mode, the aircraft comprising:
    a fuselage;
    a wing system including first and second oppositely disposed wings coupled to and extending laterally from the fuselage;
    a tiltable propulsion system rotatably coupled to the fuselage between the first and second wings, the tiltable propulsion system including a frame system having four diagonally extending arms each having a propulsion assembly coupled thereto forming a distributed thrust array, each of the propulsion assemblies including a rotor assembly; and
    a flight control system configured to independently control each of the propulsion assemblies and configured to control the orientation of the tiltable propulsion system;
    wherein, in the VTOL flight mode, the tiltable propulsion system is in a vertical thrust orientation in which each of the rotor assemblies rotates in substantially the same horizontal plane; and
    wherein, in the forward cruise flight mode, the tiltable propulsion system is in a forward thrust orientation in which each of the rotor assemblies rotates in substantially the same vertical plane.

* * * * *